June 17, 1941.　　W. C. GRIDLEY ET AL　　2,245,913
HALVED FRUIT INSPECTION AND SORTING MACHINE
Filed June 20, 1939　　3 Sheets-Sheet 3

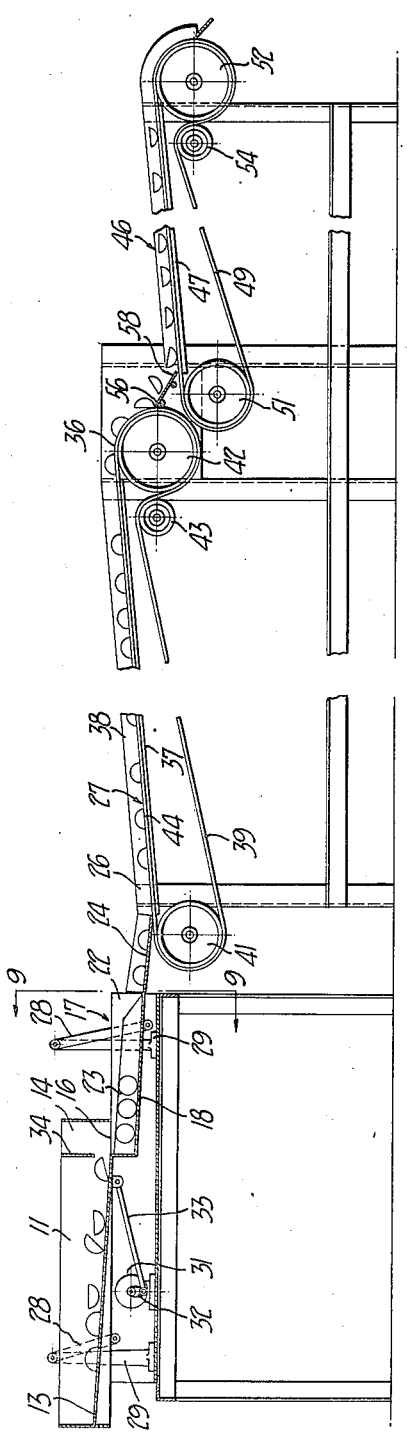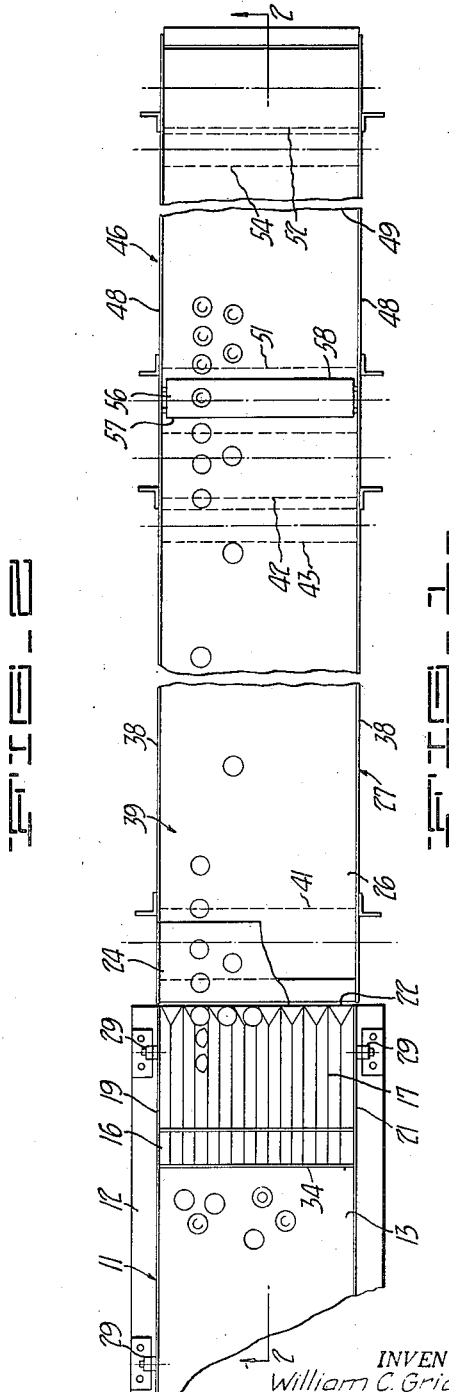

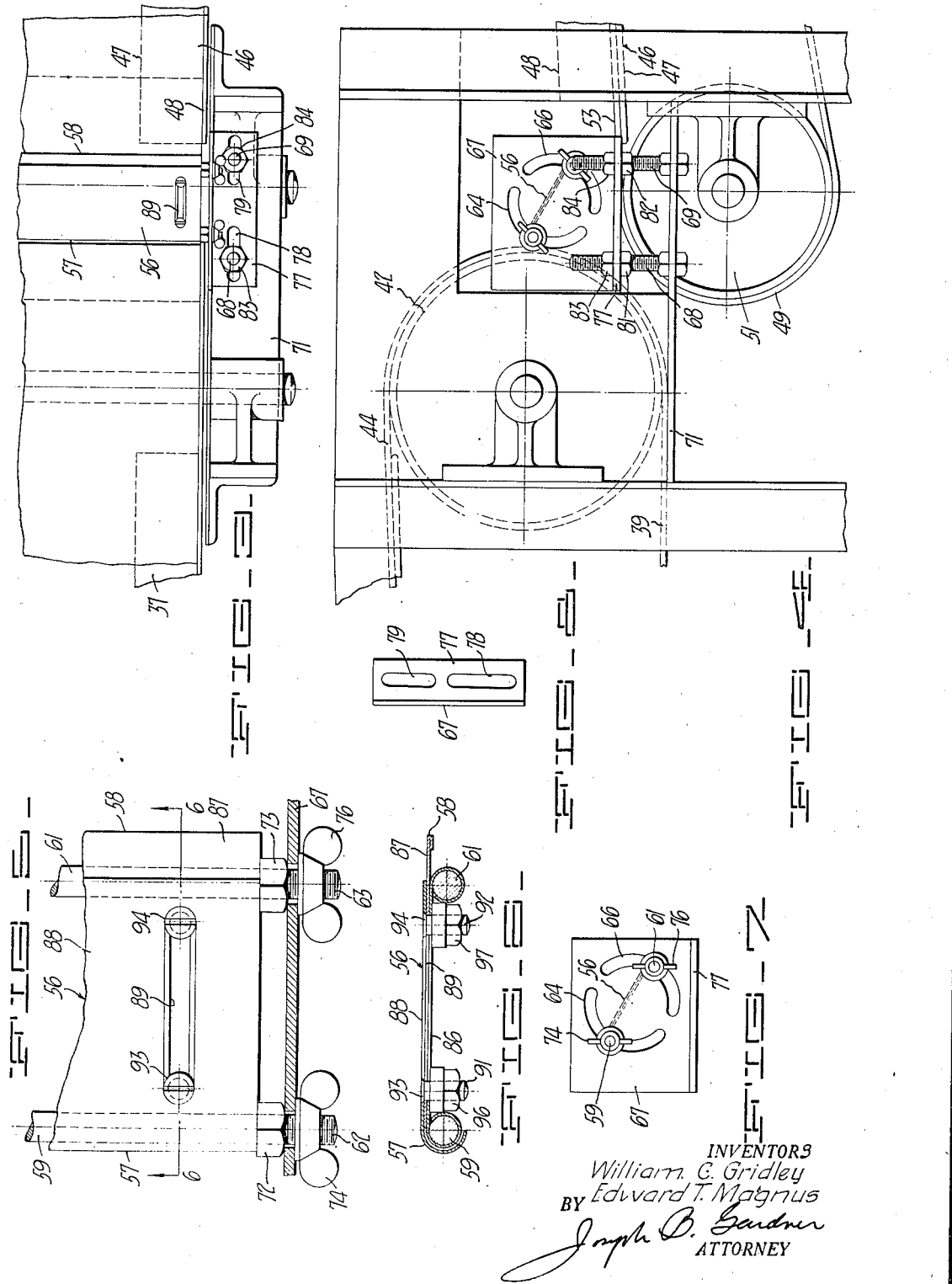

INVENTORS
William C. Gridley
Edward T. Magnus
BY
Joseph B. Gardner
ATTORNEY

Patented June 17, 1941

2,245,913

UNITED STATES PATENT OFFICE 2,245,913

HALVED FRUIT INSPECTION AND SORTING MACHINE

William C. Gridley and Edward T. Magnus, Oakland, Calif., assignors, by direct and mesne assignments, of one-half to said Gridley and one-half to P. M. Ball & Company, Oakland, Calif., a corporation of Nevada Application June 20, 1939, Serial No. 280,104

11 Claims. (Cl. 198—33)

The invention relates to a fruit inspection and sorting machine particularly designed for the inspection and sorting of cut halved fruit such as peaches, apricots and the like.

In canning halved fruit some control must be exercised over the quality of the fruit being canned so as to remove bruised or imperfect fruit halves at some stage of the canning process. Various means and methods have been used heretofore for this purpose. In some instances the fruit halves have been moved past an inspection station by means of a conveyor or the like and the fruit inspected and manually turned for sorting out the imperfect halves. In other cases where the fruit is hand packed into cans, the sorting out is effected by the operators packing the fruit into the cans. In any of such cases the fruit inspection process is relatively inefficient and may cause considerable delay and slowing up of the canning process. In accordance with the present invention and as a principal object thereof, we have provided a halved fruit inspection and sorting machine which provides for the movement of the halved fruit past an inspection station with all of the fruit halves turned in a common position of the cut face thereof, so that a large quantity of halves may be rapidly and efficiently inspected. From this station the fruit halves are inverted and passed by a second inspection station whereby the opposite sides of the fruit halves may be inspected. By virtue of this apparatus and inspection method the fruit may be inspected and sorted out with a high degree of accuracy and speed.

Another object of the invention is to provide a fruit inspection apparatus and method of the character described wherein the halved fruit is moved continuously through the apparatus and wherein the inspection tables or stations are of convenient height for observation and elongated to accommodate several inspectors if desired at each station.

A further object of the invention is to provide a fruit inspection apparatus of the character above which will be automatic and positive in its operation of feeding and turning the halved fruit.

Yet another object of the invention is to provide an apparatus of the character above having an improved halved fruit turning means.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a plan view of a halved fruit inspection and sorting machine constructed in accordance with the present invention.

Figure 2 is a vertical longitudinal section of the machine taken substantially on the plane of line 2—2 of Figure 1.

Figure 3 is an enlarged plan view of a part of the machine.

Figure 4 is a side elevation of the part of the machine illustrated in Figure 3.

Figure 5 is a plan sectional view of a part of the machine illustrated in Figures 3 and 4.

Figure 6 is a cross-sectional view taken substantially on the plane of line 6—6 of Figure 5.

Figure 7 is a side elevation of a part of the machine illustrated in Figures 3 to 5.

Figure 8 is a plan view of the member shown in Figure 7.

Figure 9:
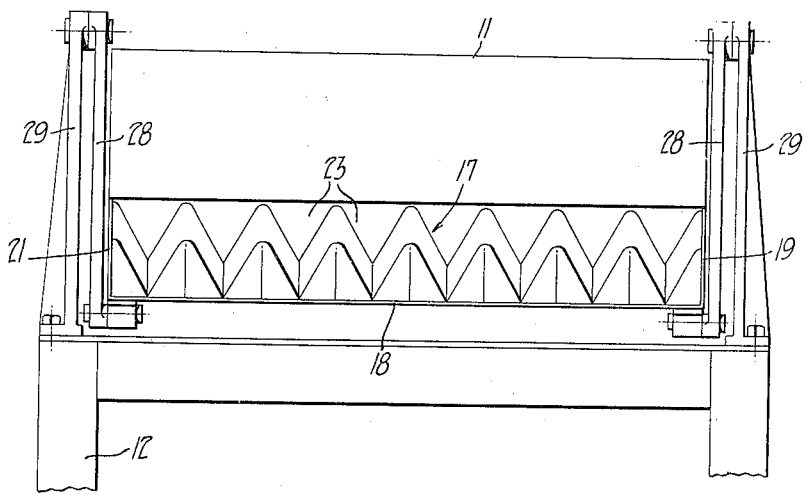
Figure 9 is a cross-sectional view of the machine taken substantially on the plane of line 9—9 of Figure 2.
Figure 10:
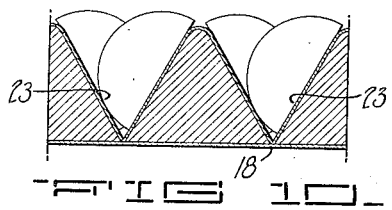
Figure 10 is a fragmentary cross-sectional view of one of the peach halved turners taken at one longitudinal position thereof.
Figure 11:
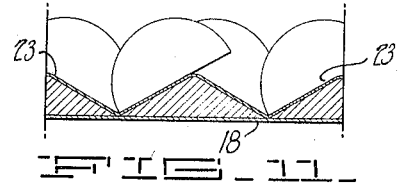
Figure 11 is a cross-sectional view similar to Figure 10 but taken at a different longitudinal position.
Figure 12:
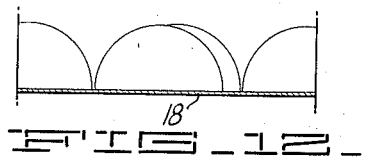
Figure 12 is a cross-sectional view similar to Figures 10 and 11 and taken at still another longitudinal position of the turner.

The fruit inspection and sorting machine of the present invention consists of a plurality of fruit inspection table sections or platforms, along which the fruit is advanced for inspection, in combination with means depositing the fruit on one of the sections with the same side of the fruit uppermost, and means positioned between the sections and operative to receive the fruit from one section, invert the fruit, and deliver the inverted fruit to the other section.

More specifically and with reference to the accompanying drawings, the apparatus comprises a fruit receiving box or hopper 11, which is here mounted on a table support 12 and is provided with an inclined bottom 13 for advancing the fruit towards one end 14 thereof. The fruit is discharged from an open bottom portion 16 at the end 14 onto a fruit turning and orienting mechanism 17, here integrally associated with the hopper 11. The means 17 is here in the form of a table including a bottom 18, opposed longitudinal sides 19 and 21, and an open discharge end 22 and is formed with a plurality of contiguous parallel longitudinally disposed V-shaped grooves or guides 23, through which the halved fruit is passed from the receiving end 16 to the discharge end 22. The depth of the grooves at the receiving end 16 is preferably greater than half of the diameter of the peaches or other cut fruit, and which depth is lessened at the discharge end 22 and the grooves gradually flattened out at such end and there merge into a flat surface so as to cause the halved fruit deposited in the grooves to turn upon passage longitudinally through the grooves and emerge with the cut face of the fruit downward at such discharge end. The table is preferably inclined downwardly towards the discharge end to increase the rate of travel of the peaches through the grooves. An apron 24 is provided at the discharge end over which the halved peaches slide to the receiving end 26 of a fruit inspection table 27.

Means is provided for advancing the fruit through the hopper and guides and here consists of a mechanism for longitudinally shaking or oscillating the integral hopper and guide structure. For this purpose the hopper and guide tables are mounted on links 28 pivoted to standards 29 arranged on opposite sides of the hopper and guide tables on the supporting table 12. An oscillatory movement is imparted to the hopper and guide tables by means of an electric motor 31 which is connected to the tables by means of a crank arm 32 and connecting link 33. Preferably, a guard plate 34 is mounted across the hopper box adjacent the end 14 thereof to cause the fruit halves to pass to the open bottom portion 16 in single layers.

As aforementioned, the halved fruit is deposited from the turning means 17 onto one end of a fruit inspection table 27 and is so deposited with the fruit halves uniformly positioned with their cut faces downward. The table 27 is preferably of elongated form and positioned at a convenient inspection height and is operable to move the fruit longitudinally thereover to the discharge end 36 thereof so that an inspector or several inspectors positioned at one or both of the longitudinal sides of the table may quickly and easily inspect the fruit moving along the table. The table here consists of an elongated stationary channel made up of bottom pieces 37 and upright longitudinal sides 38 in which is supported a longitudinal moving conveyor for the fruit. Preferably, and as here shown, the conveyor comprises a broad elongated endless belt 39 which is supported adjacent the opposite ends of the table on rollers 41 and 42 and a slack take-up roller 43. The upper run 44 of the belt is carried on the bottom pieces 37 of the channel and is arranged to receive, support and carry halved fruit deposited thereon from the apron 24 longitudinally along the table 27 to the discharge end 36 thereof at the roller 42.

In accordance with the present invention the halved fruit is removed from the table 27 at the end 36 thereof and inverted and delivered in inverted position to a second inspection table 46, along which the fruit is advanced for inspection of the opposite or cut face of the fruit halves. The table 46 is of similar form and construction to the table 27 and includes an elongated channel support made up of bottom pieces 47 and longitudinal sides 48 which receive an elongated endless belt 49. This belt is carried on end rollers 51 and 52 and is positioned with the upper run 53 thereof on the bottom pieces 47. The lower run of the belt is also supported on a slack take-up roller 54. The supporting roller 51 is here positioned adjacent and somewhat under the end supporting roller 42 of the belt of the first table, so that fruit will be discharged from the first belt adjacent to the receiving end of the second belt.

Means is provided between the two tables for receiving the halved fruit from the first table and inverting the fruit and delivering the fruit halves in inverted form to the second table. This means here consists of an elongated plate 56 extending transversely of the tables and which is mounted between the belt supporting rollers 42 and 51 and is arranged with one edge 57 thereof transversely across the belt 39 at a vertical position intermediate the height of the roller 42. From this edge the plate inclines downwardly so as to dispose the opposite edge 58 thereof adjacent the upper run 53 of the second belt. In operation the plate edge 57 engages the leading edge of the fruit half as the same descends over the top outer side of the roller 42 so as to cause the fruit to turn and rotate onto the plate and gravitate thereover to the second belt. The width of the plate is such as to cause the fruit half to turn substantially 180° so that the fruit will be deposited on the second belt with the cut face of the fruit uppermost. In order to accommodate the last mentioned turning means to fruit halves of various sizes, we provide for the adjustment of the vertical and longitudinal position of the plate 56 relative to the roller 42 and further provide for the adjustment of the width of the plate and the incline of the plate. The structure providing this group of adjustments is illustrated in Figures 3 to 7, of the drawings. As illustrated in the drawings, the plate is supported on a pair of transverse rods 59 and 61 which are secured to the underside of the plate and extend thereacross adjacent the edges 57 and 58 of the plate aforementioned. The opposite ends 62 and 63 of the rods are mounted in arcuate slots 64 and 66 formed in supporting plates 67 at the opposite ends of the plate 56 and in turn supported on vertical studs 68 and 69 secured to a stationary supporting plate 71 forming part of the table supporting construction. The outer ends 62 and 63 of the rods are threaded and engaged by nuts 72 and 73 for holding the plate 56 in place and which nuts are mounted at the inner side of the supporting plate 67. Wing nuts 74 and 76 carried on the rod ends and engaging the outer side of the supporting plate 67 serve to hold the rods in adjusted position in the arcuate slots 64 and 66. By means of this construction the rods may be rotated in the arcuate slots 64 and 66 for positioning the plate 56 at various inclined angles.

The supporting plate 67 is here formed as an upright part of a horizontal base plate 77 which is engaged by the studs 68 and 69 and the base plate 77 is formed with a pair of elongated slots 78 and 79 for receiving the studs and for shifting the plate 67 and the plate 56 carried thereby horizontally relative to the roller 42. The base plate 77 is rested on nuts 81 and 82 on the studs 68 and 69 and is clamped down on such nuts by means of a pair of nuts 83 and 84 on the studs. Vertical adjustment of the assembly may be simply effected by raising the nuts 81, 82, 83 and 84 on the studs.

In the present construction, the plate 56 is constructed of three superimposed pieces 86, 87 and 88. The inner piece 86 consists of a flat strip of metal which extends between the rods 59 and 61 and is secured at its ends to the rods as by wrapping the ends of the strip around the rods. The intermediate piece 87 and superimposed outer piece 88 are adapted for longitudinal separation for extending the plate in the direction of the rollers 42 and 51. To hold the several pieces in adjusted longitudinal position, the latter are provided with aligned vertical slots 89 through which are engaged clamping bolts 91 and 92. Preferably, the slot in the upper plate member 88 is beveled for the receipt of the heads 93 and 94 of the bolts in counter-sunk relation, whereby the upper surface of the plate will be smooth. In accordance with this construction the longitudinal length of the plate may be adjusted by loosening nuts 96 and 97 carried on the bolts 91 and 92 and then extending or contracting the plate sections 87 and 88 to a desired width of the plate.

Any suitable drive means may be connected to the belt supporting rollers for providing a smooth and continuous movement of the belts along the inspection tables, it being understood that the movement imparted to the belt 39 is such as to advance the upper run thereof in the direction of the second inspection table and the movement imparted to the belt of the second table is such as to advance the upper run of the belt away from the first table.

Preferably, both of the inspection tables are approximately horizontal and arranged at a convenient height for inspection of the fruit passing thereover, and in carrying out this arrangement we prefer to arrange the table 27 with a slight incline from the receiving end 26 to the discharge end 36 thereof so as to raise the discharge end above the receiving end of the second table. Preferably, the second table is also inclined slightly in conformity with the first table so that the two tables will have a substantially equal average inspection height. The very small incline of the table assists the inspector in making a rapid and accurate inspection of the fruit.

It will now be clear that the fruit inspection and sorting machine of the present invention is capable of receiving a relatively large quantity of halved fruit and will initially orient the indiscriminately deposited fruit halves into a common position of the cut face on the first fruit inspection table and all of the fruit will pass over this table in such common position of the cut face thereof. With the fruit in such position, operators or inspectors may quickly and readily sort out the bruised or imperfect fruit halves. It will further be clear that the apparatus is effective to receive the fruit from the first table and invert the same and deliver the fruit halves in inverted position to a second table for similar inspection and sorting. Lastly, it will be clear that the operation of the machine is positive, automatic and continuous, whereby a relatively large quantity of fruit may be passed through the machine and continuously inspected without danger of erratic or defective operation any of the machine parts.

We claim:

1. A halved fruit inspection and sorting machine comprising, a pair of elongated inspection tables each including a belt conveyer for carrying the fruit lengthwise of said tables for inspection of the exposed side of the fruit, means for delivering halved fruit in a common position of the cut face thereof to the conveyer on one of said tables, and means mounted to receive fruit from said last mentioned conveyer and operative to invert the halved fruit and deliver the fruit in inverted position to the conveyer on said other table.

2. A halved fruit inspection and sorting machine comprising, a pair of elongated inspection tables each having a belt conveyer top operative to advance said fruit halves lengthwise of said tables for inspection of the exposed side of said fruit, means for delivering halved fruit in a common position of the cut face thereof to one of said table tops, and means mounted to receive fruit from said last mentioned table top and operative to invert the halved fruit and deliver the fruit in inverted position to said other table top.

3. A halved fruit inspection and sorting machine comprising, a pair of elongated substantially horizontal endless belt portions adapted for the support and movement of halved fruit and horizontally spaced and positioned with the discharge end of one portion adjacent to the receiving end of the other portion and openly exposed for viewing and inspection of the upper side of the fruit, means for delivering halved fruit in a common position of the cut face thereof to the receiving end of the first belt portion, and means mounted to receive said fruit from the discharge end of said first belt portion and operative to invert the halved fruit and deliver the same in inverted position to the receiving end of said second named belt portion.

4. A halved fruit inspection and sorting machine comprising, a pair of elongated substantially horizontal endless belts adapted for the support and movement of halved fruit and horizontally spaced and positioned with the discharge end of one adjacent to the receiving end of the other and openly exposed for viewing and inspection of the upper side of the fruit, means for delivering halved fruit in a common position of the cut face thereof to the receiving end of the first belt, and means mounted to receive said fruit from the discharge end of said first named belt and operative to invert the halved fruit and deliver the same in inverted position to the receiving end of said second named belt, said last named means providing for the continuous movement of said fruit from said first to said second named belt.

5. A halved fruit inspection and sorting machine comprising, a fruit receiving hopper, means receiving fruit from said hopper and including a plurality of longitudinal guides differing in form longitudinally thereof and adapted to receive the halved fruit adjacent one end of the guides and to orient the fruit with the cut face thereof downward upon passage of the fruit longitudinally through the guides, means for shaking said last named means to advance the fruit through said guides and for discharging the fruit from said means adjacent the opposite end of said guides, an elongated substantially horizontal endless conveyer having one end thereof positioned adjacent the discharge end of said first means and adapted to receive the cut fruit face down and to advance the fruit over the length of the conveyor for inspection of the outer convex side of the fruit, a roller supporting the opposite end of said conveyer, an inclined plate positioned with the upper edge thereof adjacent to said conveyor at said roller for removing the fruit from the conveyor and adapted to engage the leading edge of a fruit half and turn the latter to an inverted position during movement of said half across said plate, and a second elongated substantially horizontal endless conveyor positioned with one end thereof under the lower edge of said plate and adapted to receive the fruit halves from said plate with the cut face of the halves uppermost and operative to advance said fruit halves over the length of the conveyor for inspection of the cut face of the fruit.

6. A device for turning fruit halves comprising, an endless belt adapted to receive friut halves with their cut face downward, a roller for supporting one end of said belt, means for moving said belt to advance said cut fruit towards said roller, a stationary plate having an abutment edge extending horizontally across said belt at said roller and at a vertical position intermediate the height of said roller at the exterior convex side of said belt and sufficiently below the top of the roller to engage the leading edge of said fruit halves in a substantially vertical position of the plane of the cut face of said fruit halves and being inclined downwardly longitudinally from said belt for causing the gravitating and turning of the fruit halves thereover to invert the fruit, and means for receiving said fruit halves in inverted form from the lower edge of said plate.

7. A device for turning fruit halves comprising, an endless belt adapted to receive fruit halves with their cut face downward, a roller for supporting one end of said belt, means for moving said belt to advance said cut fruit towards said roller, a stationary plate having an edge extending horizontally across said belt at said roller and at a vertical position intermediate the height of said roller at the exterior convex side of said belt and adapted to receive the leading edge of said fruit halves for removing the same from said belt, said plate being inclined downwardly longitudinally from said belt for causing the gravitating and turning of the fruit halves thereover to invert the fruit, adjustable supporting means for said plate for altering the position of said plate horizontally and vertically relative to said roller, and means for receiving said fruit halves in inverted form from the lower edge of said plate.

8. A device for turning fruit halves comprising, an endless belt adapted to receive fruit halves with their cut face downward, a roller for supporting one end of said belt, means for moving said belt to advance said cut friut towards said roller, a stationary plate having an edge extending horizontally across said belt at said roller and at a vertical position intermediate the height of said roller at the exterior convex side of said belt and adapted to receive the leading edge of said fruit halves for removing the same from said belt, said plate being inclined downwardly longitudinally from said belt for causing the gravitating and turning of the fruit halves thereover to invert the fruit, supporting means for said plate adjustable to vary the inclination of said plate, and means for receiving said fruit halves in inverted form from the lower edge of said plate.

9. A device for turning fruit halves comprising, an endless belt adapted to receive fruit halves with their cut face downward, a roller for supporting one end of said belt, means for moving said belt to advance said cut fruit towards said roller, a stationary plate having an edge extending horizontally across said belt at said roller and at a vertical position intermediate the height of said roller at the exterior convex side of said belt and adapted to receive the leading edge of said fruit halves for removing the same from said belt, said plate being inclined downwardly longitudinally from said belt for causing the gravitating and turning of the fruit halves thereover to invert the fruit, extensible members carried by said plate and adjustable to vary the longitudinal length thereof, and means for receiving said fruit halves in inverted form from the lower edge of said plate.

10. A machine for inspecting and sorting fruit halves comprising, an elongated substantially horizontal endless belt portion adapted for the support and movement of fruit halves and openly exposed for viewing and inspection of the upper side of the fruit, means for delivering fruit halves in a common position of the cut faces thereof to said belt portion, a roller supporting one end of said belt portion and defining the discharge end thereof, means for moving said belt portion towards said discharge end, and means for receiving, inverting and conveying away of fruit halves from said discharge end comprising, the combination of a second elongated substantially horizontal endless belt portion adapted for the support and movement of fruit halves and having a receiving end spaced adjacent said discharge end of said first belt portion, and a device operatively positioned intermediate said discharge end of said first belt portion and said receiving end of said second belt portion and engaging said fruit halves and effecting a sufficient turning thereof whereby said fruit halves will be carried along on said second belt portion in inverted position.

11. A halved fruit inspection and sorting machine comprising, an elongated substantially horizontal endless belt portion adapted for the support and movement of fruit halves, means for delivering fruit halves in a common position of the cut faces thereof to said belt portion, means at the discharge end of said belt portion for displacing the plane of the cut face of said fruit halves from a horizontal to a substantially vertical position, and an abutment member extending transversely across said last named means and positioned to engage the lower leading edge of said fruit halves to cause the latter to rotate about said edge to position said cut face uppermost.

WILLIAM C. GRIDLEY.
EDWARD T. MAGNUS.

CERTIFICATE OF CORRECTION.

Patent No. 2,245,913. June 17, 1941.

WILLIAM C. GRIDLEY, ET AL.

It is hereby certified that the name of the assignee of one-half interest in the above numbered patent was erroneously described and specified as "P. M. Ball & Company" whereas said name should have been described and specified as --F. M. Ball & Company--, as shown by the record of assignments in this office; and that the said Letters Patent should be read with this correction therein that the same may conform to the record of the case in the Patent Office.

Signed and sealed this 23rd day of September, A. D. 1941.

(Seal)

Henry Van Arsdale,
Acting Commissioner of Patents.